UNITED STATES PATENT OFFICE.

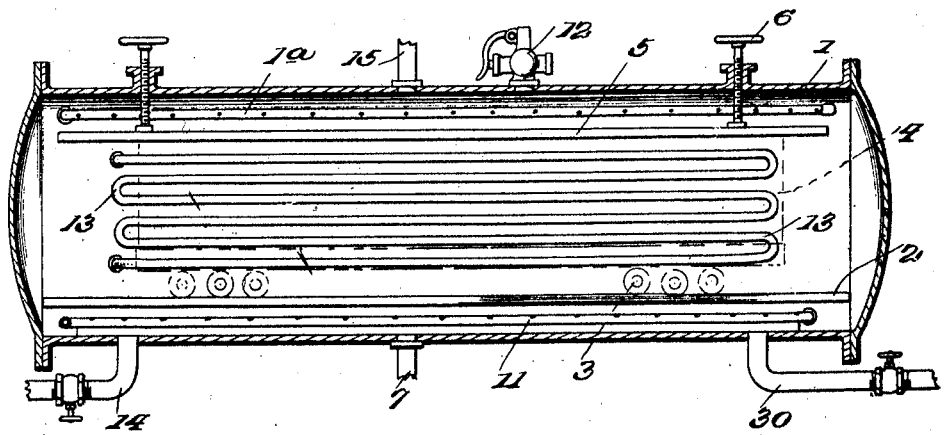
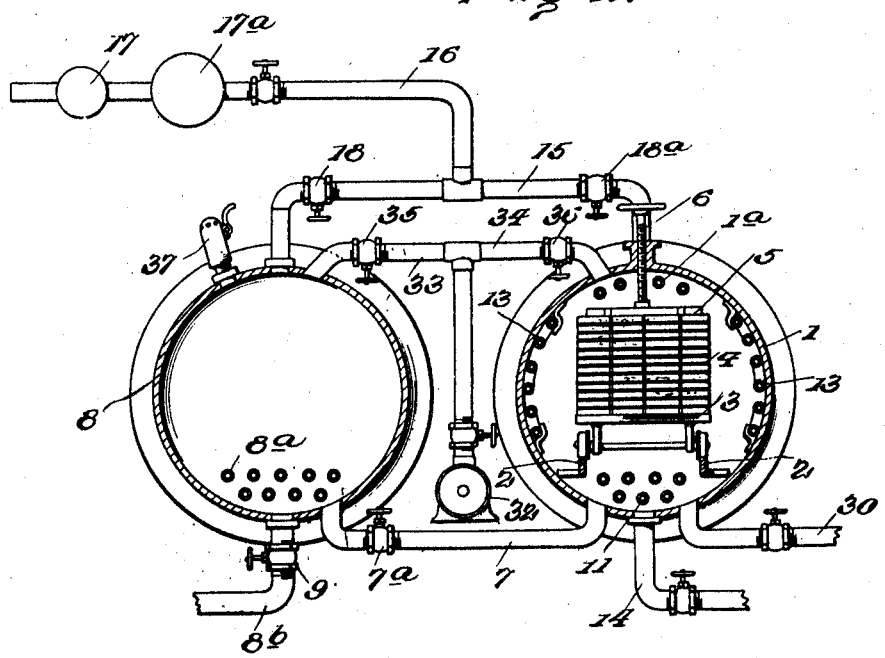

FREDERICK K. FISH, JR., OF NEW YORK, N. Y.

PROCESS FOR TREATING AND DRYING WOOD.

1,328,657.  Specification of Letters Patent.  Patented Jan. 20, 1920.

Application filed November 21, 1919. Serial No. 339,616.

*To all whom it may concern:*

Be it known that I, FREDERICK K. FISH, Jr., a citizen of the United States, residing at New York, in the county of New York and State of New York, have invented certain new and useful Improvements in Processes for Treating and Drying Wood, of which the following is a specification.

This invention relates to improvements in a process for treating and drying wood.

In several of my prior applications for patents, for instance, Serial No. 121,187, filed Sept. 20, 1916, and Serial No. 212,467, filed Jan. 18, 1918, I have carefully and minutely described processes for treating and drying wood which involves preliminarily preparing the wood, and subsequently treating it in super-heated water to dissolve and remove the water soluble constituents, melt and spread the resins, enlarge the fibers, and thereafter, by various steps permeate the fibers with the wood's insoluble resins, and finally drying the wood.

I have found that the preliminary treatment of the wood may be materially improved by first sweating the wood in waste steam, or by other suitable means, or by subjecting the wood while in a tightly closed chamber to heat; then subjecting the wood to a vacuum, with or without heat, and then destroying the vacuum by introducing steam under pressure. By so treating the wood with live steam under pressure in addition to the sweat box step described in my former applications, the structure is quickly softened throughout, and the water soluble constituents and the contained resins are further softened and put in a much better condition for quick action by subsequent treatment, and the cooking or hardening of the resins is obviated. After the wood is preheated or sweated, it is subjected to a vacuum to expel a portion of the air and a part of the moisture, and to open the pores. The vacuum is then destroyed by introducing steam under pressure in the container, while maintaining heat, to raise the temperature of the wood throughout, and the pressure surrounding it, and to further soften the resins, gums and other sap matters. The steam is cut off, and the wood is subjected to a second vacuum, while maintaining heat, to expel moisture from the wood, and reduce the pressure within and surrounding it below atmospheric, to further open the pores for the more ready and quick penetration of the water used in the next step in the process.

Thus far the treatment has rendered the wood soft and pliable, the gums and sap have been diluted and the resins have been softened. On account of the high temperature obtained at the center of the wood by means of the steam under pressure, the soluble constituents are more susceptible to being quickly and effectively acted upon by the water subsequently employed, than is attainable in the processes described in the beforementioned applications.

The wood is now submerged in super-heated water, the temperature of which is maintained by any suitable means, such for instance as steam coils. The super-heated water acts quickly to dissolve and remove the water soluble constituents in the wood, both inter and intra cellular, and also to convert some insoluble into soluble constituents and it also melts the resins and other like matters of preservative character, so that the latter may more readily spread throughout the fibrous structure of the wood, as well as to soften and expand the wood fibers. While the wood is submerged, the pressure in the container is alternated or changed from a pressure above atmospheric to a lower pressure, preferably below atmospheric. Such alternation in pressure causes substantially an ebb and flow of the water in and out of the wood, which rapidly and effectively washes out water soluble constituents from the fiber structure, causing more certain penetration of the cell walls and fibers; and such flow of the water also aids very materially in spreading the melted resins throughout the fibers of the wood and effectively enlarges the fibers and expands the wood structure. The number of such alternations in pressure is varied, as desired with the character of the wood, and the extent to which it is desired to remove the soluble constituents. When the results desired are attained, the water is removed from the container. The pressure surrounding the wood is next reduced below atmospheric to any degree of vacuum. This vacuum is attained by forcing cold water into the container, preferably upon the lumber, through spray pipes to cool the lumber and suddenly condense the vapors in the container and in the lumber, the vapors in the lumber quickly passing from its interior, surfacewise. If desired, a vacuum pump may be employed in conjunction with the cold water to assist in creating the vacuum.

When the desired amount of vacuum has been attained the wood is again subjected to treatment by the water, and after removal of the water from the container, a vacuum is again created to remove moisture from the wood. Thereafter the pressure within the container is raised by introducing steam, superheated or highly heated air or a mixture of steam, air or other gaseous medium, at the same time the temperature within the container is maintained at or raised above the point of vaporization of water at the degree of pressure attained. The change from vacuum to pressure causes a thorough penetration of the wood by the steam or gaseous medium, effecting a rapid drying of the wood. After being subjected to such pressure and heat, the wood may be again subjected to another vacuum or lowering of pressure below atmospheric to assist in the drying, by materially moving the moisture from the interior to the surface, this action also serving to secure a further expansion of the fibers.

After this treatment the wood is removed to a drying chamber and is subjected to the drying action of super-heated steam, heated air or other heated medium. This drying treatment is kept up until a large percentage of the moisture is evaporated, and then the wood is removed to a chamber to be conditioned.

In the foregoing description, I have given a general outline of the steps in process, and in the description to follow I will more specifically point out the various steps in their sequence and the functions accomplished.

In the accompanying drawing, I have illustrated conventionally one way for carrying out the process.

Figure 1 is a central vertical longitudinal section of a container in which the wood is treated.

Fig. 2 is a conventional cross section of the same, and the parts associated therewith.

1 indicates a container which, when closed, is steam tight. The container is provided with a track 2 to receive a car 3, upon which the wood 4 is stacked, with stickers therebetween. The container 1 is also provided with a presser device 5, and extending therefrom and through the top of the container are screw-threaded means 6, for the purpose of preventing the lumber floating when the water is introduced into the container, and to prevent the wood warping, and in the container are spray pipes 1ª.

7 is a pipe, communicating with a tank 8, and the container 1, to introduce superheated water to the latter, 7ª indicating a valve to control the pipe. The tank 8 is capable of holding pressure and is provided with heating coils 8ª and a pressure inlet pipe 33. 11 are perforated coils for supplying live steam to create pressure within the container, when desired. 12 is a safety valve for regulating pressure within the container 1; 13 are heating coils and 14 indicates a pipe through which heated air, steam, superheated steam or other gaseous medium is introduced to the container. 15 indicates a pipe connecting the top of the tank 8 and the container 1, and leading therefrom is a branch pipe 16 in which there is a vacuum pump 17, and a condenser 17ª; appropriate valves 18 and 18ª being provided to control the pipes.

In carrying out my improved process a quantity of wood, preferably green, is first preheated in a shed or chamber, (not shown) preferably without ventilation, to sweat it, which softens and heats the wood throughout. This may be accomplished by utilizing waste heat or steam, and in this step the heat of the wood, which, if say, is about one inch thick, is in approximately one hour, raised to a temperature of 175 degrees F., without cost, thus saving the time and heat necessary to raise the temperature of the wood in the container. The action of the heat softens the wood and renders it more susceptible to treatment when subjecting it to the succeeding steps of my process. After preheating the wood, it is removed from the sweat chamber, and the car 3 is moved into the container 1 upon track 2, and the presser device 5 is lowered to impinge the wood and to hold car 3, with its load of wood firmly on the track, which prevents the wood floating or warping when water is introduced. When the charge of wood is introduced into the container 1, and the container is tightly closed and the presser plate is adjusted, a vacuum is created in the container to expel a large portion of the air and some of the moisture from the wood and otherwise prepare the wood for the ready penetration of the steam introduced in the next step of the process. When subjecting the wood to the treatment of the vacuum, heat may be simultaneously introduced into the container by passing steam through the coils 13. The vacuum is maintained for a period, approximately ten minutes, more or less and may be broken or destroyed by the introduction of live steam into the container through the perforated pipes 11, which steam penetrates the wood structure throughout.

The action of the steam raises the temperature in and further softens the wood, and the pores are further opened up and the soluble constituents are made more susceptible to being dissolved and removed from the wood under the action of the water into which the wood is to be submerged.

The vacuum is again set up to remove the steam or gas from the cells of the wood and reduce the pressure within the wood below atmospheric, which allows the wood to be quickly and readily acted upon by the water, or other liquid employed in the next step in the process. While this vacuum is maintained heat may be applied by the heating coils 13 or otherwise.

After this treatment the wood is soft and plastic and more susceptible to quick action by the water. The vacuum is broken and water preferably super-heated is introduced into the container from the tank 8, through pipe 7, in sufficient quantity to completely submerge the wood. The temperature of the water in the container as introduced may range from 33° F. to about 250° F., but the latter temperature is to be preferred, and this temperature is maintained by heat from the coils 13, or by introducing steam through the perforated pipes 11. Sufficient water is introduced into the container to completely submerge the wood, leaving a space above the water to receive the vapors and steam to provide for the desired pressure. The desired pressure is maintained for a time sufficient to secure a thorough penetration of the wood by the water which is rapidly driven into the cells and through the fibers, dissolving and removing the water soluble constituents of the wood. The introduction of steam through pipes 11 and 13 is stopped and pressure in the container is then suddenly dropped or lowered to approximately atmospheric pressure, by opening up escape valve 12. As the pressure is removed from around the wood, the difference between the internal pressure within the wood and the external pressure surrounding it causes the wood to expand, and considerable of the liquid within the wood, with the dissolved constituents therein are removed from the wood into the water surrounding it. This also causes the resins of the wood to melt and spread.

The lowering of pressure surrounding the wood may be hastened by applying the vacuum pump above the water, and simultaneously introducing cold water into the container through a pipe 30 to lower the temperature of the water in which the wood is submerged. When the pressure surrounding the wood has reached atmospheric, the escape valve is closed and the pressure surrounding the wood is further lowered by continued operation of the vacuum pump and the continuance of the supply of cold water into the container. But the introduction of cold water must be stopped as soon as the temperature of the water in which the wood is submerged has fallen to the boiling point corresponding to the vacuum which it is desired to reach. When the pressure within the wood has reached approximately the exterior pressure, the vacuum pump is stopped, the steam is again introduced through pipes 11 and 13 and the pressure and temperature of the water surrounding the wood is rapidly raised above atmospheric and consequently above the pressure within the wood, causing the water to rapidly permeate the wood. These alterations in pressure above and below atmospheric may be continued until the desired degree of removal of the water soluble constituents is attained. While the wood is undergoing this treatment, steam, heated air, or other gaseous medium may be introduced in the water below the wood through the pipe 14 to agitate the water to thoroughly mix the water soluble constituents which have been removed from the wood uniformly throughout the body of the water.

The above treatment causes an ebb and flow of water throughout the entire wood structure, causing the water to enter the cell walls and fiber structure of the wood, expanding it, dislodging and washing out the gums and water soluble constituents, and spreading the resins about and into the wood fibers.

After the wood has been subjected to the above treatment for sufficient time the water is rapidly removed from the container and the pressure within the container is rapidly lowered below atmospheric to any desired degree of vacuum by spraying cold water through spray pipes 1$^a$ on or around the wood, or operating the vacuum pump 17, and if desired, heat sufficient to evaporate moisture may subsequently be maintained by means of the heating coils 13. During the time that the vacuum is maintained, highly heated air, steam or superheated steam is introduced to the container through the pipe 14. The heated air or steam introduced into the container, about equals, or is slightly less than the amount the vacuum pump is removing, to maintain in the wood a temperature above the boiling point of the water in the wood, while at the same time a portion of the moisture and water content in the wood is being removed. The vacuum pump is now stopped, and the vacuum broken by introducing through the perforated pipes, steam, superheated steam, air or superheated air, or other gaseous mediums, or by the evaporating moisture from the wood. After the vacuum has been broken, the temperature of the wood may be raised and moisture evaporated therefrom by heated air, steam, superheated steam, or other gaseous medium under pressure or otherwise.

The vacuum action after the superheated water, compels the ready penetration of gases, or other heating mediums to enter the interior of the wood under treatment, which causes the rapid evaporation of the water content. Consequently, when the wood is conveyed to a drying chamber, it will require materially less time and less heat to complete the drying of the wood. The water and vacuum treatment may, if desired, be repeated to further act on the wood to dissolve and remove the water soluble constituents. Each time these steps act on the wood, any remaining soluble constituents are more readily attacked and removed. An air compressor 32, may be connected to the tank 8, and the container 1, by pipes 33 and 34, provided respectively with valves 35 and 36. The compressor may be operated and when the valve 36 and the safety valve 37, in the tank are opened, the pressure above the water in the container quickly forces the water into the tank, the pressure above the water in the latter being relieved through the valve 37. The compressor may also be employed to force the water from the tank 8 to the container by opening the valve 12.

The wood is withdrawn from the container and is preferably covered and insulated to retain the heat, and is conveyed to a kiln (not shown) where it is dried. The wood while in the kiln, is subjected to any suitable temperature which may attain approximately 250° F., but preferably and usually a temperature from 160° F. to 215° F. will suffice.

It is not essential to dry the wood entirely within the kiln, as it is obvious that the wood may be alternately run into the kiln, and there subjected to the drying medium and subsequently withdrawn to be subjected to the atmosphere, or I may introduce into the kiln a current of dry air, or a current of reheated moist air, previously removed from the kiln and mixed with dry air, heated or otherwise, or by super-heated steam, mixed with moist air previously removed from the kiln, or by other gaseous mediums mixed with any of the above. The humidity of the kiln may be regulated by removing accumulating moisture periodically or continuously, or by live steam periodically supplied to the kiln, or by jets of water projected into the kiln up on the wood.

This step of drying is prolonged for approximately twenty-four hours more or less, and is for the purpose of removing substantially the remainder of the moisture from the wood while preventing hardening of the resins to permit the permeation of the individual fibers with the same.

After treating the wood in the kiln, the wood is removed to a "conditioning" shed (not shown) in which there is preferably no ventilation, which prevents checking of the wood surface by too rapid cooling and consequent contraction of the outer layer and destruction of the fibers.

When the water is drawn from the container 1 to the tank 8, it is preferably again used for treating successive charges of wood. The steam which escapes through the escape valve or from the drying chamber may be utilized to preheat the wood or to heat a charge of water which may be held in a reserve tank or otherwise. What I mean in the claims by the term "vacuum" is, a reduction of pressure to such a degree below atmospheric, to bring about a substantial expansion of residual air or vapor in the interior of the wood to cause an opening up of the interior fibrous structure.

The process described produces a wood homogeneous throughout, with practically all starches, gums, saps and like readily fermentable or destructible substances which afford mediums for the development of destructive bacteria and molds removed, and the wood structure permeated with its resins and other preservative substances or values. The process also produces a wood completely dry and non-hydroscopic and in which the shrinkage in drying has been reduced to a minimum. Furthermore, the resins in the wood are spread, and replace the evaporated moisture and the removed water soluble constituents.

What I claim is:

1. The process of treating wood comprising sweating the wood to soften and heat it, then subjecting it to a vacuum, then to steam to raise the temperature of the wood, then to vacuum, then to heated water to dissolve and remove water soluble constituents, removing the water and thereafter drying the wood.

2. The process of treating wood comprising sweating the wood to soften and heat it, then subjecting it to a vacuum, then to steam to raise the temperature of the wood, then to vacuum, then to heated water to dissolve and remove water soluble constituents, and while the wood is submerged in the water, create a vacuum to reduce the pressure below atmospheric, removing the water and thereafter drying the wood.

3. The process of treating wood comprising softening and heating the wood, thereafter submerging the wood in heated water under pressure, and while submerged reduce the pressure below atmospheric to dissolve and remove the water soluble constituents, removing the water, and thereafter drying the wood.

4. The process of treating wood comprising submerging the wood in heated water under pressure and while submerged reducing the pressure below atmospheric, removing the water, and thereafter drying the wood.

5. The process of treating wood comprising submerging the wood in super-heated water, and while submerged reducing the pressure to dissolve and remove the water soluble constituents, removing the water and thereafter drying the wood.

6. The process of treating wood comprising submerging the wood in agitated, heated water, and while submerged reducing the pressure below atmospheric, and thereafter drying the wood.

7. The process of treating wood comprising submerging the wood in superheated water and simultaneously agitating the water, and while the wood is submerged reducing the pressure to dissolve and remove the water soluble constituents, remove the water and thereafter drying the wood.

8. The process of treating wood comprising sweating the wood to soften and heat it, thereafter subjecting the wood to moist heat to cause the internal temperature to rise, then to a vacuum, then to heated water under pressure to dissolve and remove water soluble constituents, removing water and thereafter drying the wood.

9. The process of treating wood comprising subjecting the wood to steam under pressure to raise the internal temperature, then to heated water under pressure to dissolve and remove the water soluble constituents, removing the water, and then drying the wood.

10. The process of treating wood comprising softening the wood, thereafter subjecting the wood to a vacuum while introducing a heated gaseous medium around the wood and substantially maintaining the vacuum.

11. The process of treating wood comprising softening the wood, thereafter subjecting the wood to a vacuum while maintaining heat and simultaneously introducing substantially the amount of a heated gaseous medium around the wood as that withdrawn in maintaining the vacuum.

12. The process of treating wood comprising submerging the wood in heated water under pressure and while submerged reducing the pressure below atmospheric to dissolve and remove water soluble constituents, removing the water, subjecting the wood to a vacuum and simultaneously introducing around the wood an amount of heated gaseous medium substantially equal to that withdrawn in maintaining the vacuum.

13. The process of treating wood comprising submerging the wood in super-heated water and while submerged causing an alternation of pressure on the water to cause a more rapid permeation of the wood to dissolve and remove water soluble constituents, removing the water then to a vacuum and simultaneously introducing around the wood an amount of heated air equal to the amount withdrawn in maintaining a vacuum.

14. The process of treating wood comprising sweating the wood to soften and heat it, thereafter subjecting the wood to a vacuum while maintaining heat and introducing around the wood a heated gaseous medium while maintaining the vacuum, and thereafter drying the wood.

15. The process of treating wood comprising sweating the wood to soften and heat it, then subjecting it to a vacuum, then to steam to raise the temperature of the wood, then to vacuum, then to heated water to dissolve and remove water soluble constituents, and while the wood is submerged in the water, create a vacuum to reduce the pressure below atmospheric, removing the water, then creating a vacuum while maintaining heat, and thereafter dry the wood.

16. The process of treating wood comprising sweating the wood to soften and heat it, then subjecting it to a vacuum, then to steam to raise the temperature of the wood, then to vacuum, then to heated water to dissolve and remove water soluble constituents, and while the wood is submerged in the water, create a vacuum to reduce the pressure below atmospheric, thereafter removing the water, then creating a vacuum while maintaining heat, then subject the wood to pressure above atmospheric, then reduce the pressure, and thereafter dry the wood.

17. The process of treating wood comprising sweating the wood to soften and heat it, then subjecting it to a vacuum, then to steam to raise the temperature of the wood, then to vacuum, then to heated water to dissolve and remove water soluble constituents, and while the wood is submerged in the water, create a vacuum to reduce the pressure below atmospheric, removing the water, then creating a vacuum while maintaining heat, then subject the wood to moisture under pressure above atmospheric, then reduce the pressure below atmospheric, and thereafter dry the wood.

18. The process of treating wood comprising submerging the wood in heated water under pressure, removing the water, subjecting the wood to a vacuum while maintaining heat and simultaneously introducing a heated gaseous medium, then subjecting the wood to heated moisture under pressure, then to a vacuum, and thereafter drying the wood.

19. The process of treating wood comprising softening and heating the wood, submerging the wood in water and while submerged subjecting the wood to pressure and to a vacuum to dissolve and remove the water soluble constituents.

20. The process of treating wood comprising submerging the wood in heated water and while submerged subjecting the wood to pressure and to a vacuum to dissolve and remove water soluble constituents, removing the water, and thereafter drying the wood.

21. The process of treating wood comprising submerging the wood in heated water and alternately treating the wood while submerged to pressure and to a vacuum to progressively dissolve and remove water soluble constituents, removing the water, and thereafter drying the wood.

22. The process of treating wood comprising sweating the wood to soften and heat it, then subjecting the wood to a vacuum, then treating the wood to steam under pressure, thereafter subjecting the wood to water under pressure, to dissolve and remove water soluble constituents, and then again subjecting the wood to a vacuum to evaporate a portion of the moisture.

23. The process of treating wood comprising sweating the wood to soften and heat it, then subjecting the wood to a vacuum, then subjecting the wood to steam under pressure, thereafter submerging the wood to water under pressure to dissolve and remove water soluble constituents, then again subjecting the wood to a vacuum to evaporate a portion of the moisture, and finally subjecting the wood to the action of heat.

24. The process of treating wood comprising sweating the wood to soften and heat it, then subjecting the wood to a vacuum, then introducing steam under pressure to destroy the vacuum and act on the wood, then again subjecting the wood to the action of a vacuum, then submerging the wood in heated water under pressure to dissolve and remove water soluble constituents, then to a vacuum, then to moist atmosphere under pressure while applying heat, then to a vacuum while applying heat, then subjecting the wood to a drying heat, and finally conditioning the wood.

25. The process of treating wood comprising subjecting the wood to heated water and while submerged subjecting it to a vacuum, to dissolve and remove water soluble constituents, and thereafter subjecting the wood to moist atmosphere while causing a heated current around the wood to carry off excess moisture.

26. The process of treating wood comprising submerging the wood in agitated heated water and while submerged subjecting it to a vacuum to dissolve and remove water soluble constituents, removing the water, thereafter subjecting the wood to a moist atmosphere while causing a current of gaseous medium to remove evaporated moisture.

27. The process of treating wood comprising submerging the wood in agitated heated water and while submerged subjecting it to a vacuum to dissolve and remove water soluble constituents, removing the water, thereafter subjecting the wood to a moist atmosphere while causing a current of gaseous medium to remove evaporated moisture.

28. The process of treating wood comprising sweating the wood to soften and heat it, then subjecting the wood to a vacuum, then to steam under pressure, then to a vacuum, then to super-heated water, and while submerged reduce the pressure below atmospheric to dissolve and remove water soluble constituents, thereafter removing the water, then to a vacuum while maintaining heat, then breaking the vacuum and subjecting the wood to pressure, then reducing the pressure below atmospheric, then subjecting the wood to a moist atmosphere while introducing a heated gaseous medium, and finally conditioning the wood.

29. The process of treating wood comprising subjecting the wood to a vacuum, then to steam under pressure, then to a vacuum, then to super-heated water and while submerged reducing the pressure below atmospheric to dissolve and remove water soluble constituents, then removing the water, then to a vacuum, while maintaining heat, then breaking the vacuum and subjecting the wood to pressure, then reducing the pressure below atmospheric, then subjecting the wood to a moist atmosphere while introducing a heated gaseous medium, and finally conditioning the wood.

30. The process of treating wood comprising subjecting the wood to steam under pressure, then to a vacuum, then to superheated water, and while submerged reducing the pressure below atmospheric to dissolve and remove water soluble constituents, thereafter removing the water, then to a vacuum while maintaining heat, then breaking the vacuum and subjecting the wood to pressure, then reducing the pressure below atmospheric, then subjecting the wood to a moist atmosphere while introducing a heated gaseous medium, and finally conditioning the wood.

31. The process of treating wood comprising subjecting the wood to a vacuum, then to superheated water, and while submerged reducing the pressure below atmospheric to dissolve and remove the water soluble constituents, thereafter removing the water, then to a vacuum while maintaining heat, then breaking the vacuum and subjecting the wood to pressure, then reducing the pressure below atmospheric, then subjecting the wood to a moist atmosphere while introducing a heated gaseous medium, and finally conditioning the wood.

32. The process of treating wood comprising subjecting the wood to super-heated water, and while submerged reducing the pressure below atmospheric to dissolve and remove water soluble constituents, thereafter removing the water, then to a vacuum while maintaining heat, then breaking the vacuum and subjecting the wood to pressure, then reducing the pressure below atmospheric, then subjecting the wood to moist atmosphere while introducing a heated gaseous medium, and finally conditioning the wood.

33. The process of treating wood comprising subjecting the wood to a vacuum while maintaining heat and introducing a heated medium while maintaining the vacuum, then breaking the vacuum and subjecting the wood to pressure, then reducing the pressure below atmospheric, then subjecting the wood to a moist atmosphere while introducing a heated gaseous medium, and finally conditioning the wood.

34. The process of treating wood comprising sweating the wood to soften and heat it, then subjecting the wood to a vacuum, then to steam under pressure, then to a vacuum, then to super-heated water and while submerged reducing the pressure below atmospheric and the temperature to dissolve and remove water soluble constituents, remove the water then to a vacuum, then destroying the vacuum and subjecting the wood to pressure, then to a vacuum, and drying the wood in a heated, moist atmosphere while introducing a heated gaseous medium causing a current and periodically removing excess moisture.

35. The process of treating wood comprising sweating the wood to soften and heat it, then subjecting the wood to a vacuum, then to steam under pressure, then to a vacuum, then to super-heated water and while submerged reducing the pressure below atmospheric and the temperature to dissolve and remove water soluble constituents, remove the water, then to a vacuum, then destroying the vacuum and subjecting the wood to pressure, then to a vacuum.

36. The process of treating wood comprising sweating the wood to soften and heat it, then subjecting the wood to a vacuum, then to steam under pressure, then to a vacuum, then to super-heated water and while submerged reducing the pressure below atmospheric and the temperature to dissolve and remove water soluble constituents, remove the water, then to a vacuum, then destroying the vacuum and subjecting the wood to a gaseous pressure.

37. The process of treating wood comprising sweating the wood to soften and heat it, then subjecting the wood to a vacuum, then to steam under pressure, then to a vacuum, then to super-heated water and while submerged reducing the pressure below atmospheric and the temperature to dissolve and remove water soluble constituents, remove the water, then to a vacuum.

38. The process of treating wood comprising sweating the wood to soften and heat it, then subjecting the wood to a vacuum, then to steam under pressure, then to a vacuum, then to super-heated water and while submerged reducing the pressure below atmospheric and the temperature to dissolve and remove water soluble constituents, remove the water and then drying the wood.

39. The process of treating wood comprising sweating the wood to soften and heat it, thereafter subjecting the wood to heated water under pressure, reducing the pressure below atmosphere by a cooling medium, then increasing the pressure above atmosphere, removing the water, and thereafter drying the wood.

40. The process of treating wood comprising softening the wood by surrounding same with moisture, thereafter submerging the wood in heated water and introducing to the water a gaseous medium, reducing the pressure surrounding the wood while same is submerged in the water, then increasing the pressure above atmospheric, removing the water, thereafter subjecting the wood to a vacuum, and subsequently drying the wood in a moist atmosphere.

41. The process of treating wood comprising sweating the wood to soften it, then creating a vacuum around the wood, then introducing a heated gaseous medium around the wood, then submerging the wood in super-heated water and while submerged reducing the pressure below atmospheric and the temperature by a cooling medium, then increasing the pressure above atmospheric and increasing the temperature, removing the water, and thereafter drying the wood.

42. The process of treating wood comprising sweating the wood to soften it, then subjecting the wood to a vacuum, then to a moist heated gaseous medium to further soften the wood, then submerging the wood in heated water and while submerged alternating the pressure to above and below atmospheric, removing the water, and thereafter drying the wood in a moist atmosphere.

43. The process of treating wood comprising sweating the wood to soften it, then to subjecting the wood to a vacuum, then to a moist heated gaseous medium to further soften the wood, then submerging the wood in heated water and while submerged alternating the pressure above and below atmospheric, removing the water, thereafter subjecting the wood to alternate vacuum and a heated gaseous medium and subsequently drying the wood in a moist atmosphere.

44. The process of treating wood comprising softening the wood, thereafter submerging the wood in heated water and alternately raising the pressure above and below atmospheric and when the temperature is lowered introducing a gaseous medium to the water, removing the water, thereafter subjecting the wood to alternating treatment of a vacuum and a gaseous medium to evaporate a portion of the moisture, and then drying the wood.

45. The process of treating wood comprising sweating the wood, thereafter subjecting the wood to steam under pressure to raise the internal temperature, then to heated water under pressure to dissolve and remove the water soluble constituents, removing the water, and then drying the wood.

46. The process of treating wood, comprising subjecting the wood to a vacuum to open up the pores, then to water under pressure below atmospheric, and at a temperature sufficient to boil it, removing the water, then to a vacuum, then to water under pressure below atmospheric at a temperature sufficient to boil it, removing the water, and then to a vacuum.

47. The process of treating wood comprising subjecting the wood to steam, then to a boiling action in water by heat under a partial vacuum, and thereafter subjecting the wood to steam under pressure.

48. The process of treating wood comprising submerging the wood in water, under pressure, above atmospheric then suddenly lowering the pressure of water surrounding the wood to a pressure below atmospheric.

49. The process of treating wood comprising subjecting the wood to steam under pressure, thereafter to water under pressure, removing the water thereafter subjecting the wood to steam under pressure.

50. The process of treating wood comprising subjecting the wood to water under pressure, lowering the pressure then re-applying the pressure while the wood is submerged in the water.

51. The process of treating heated wood containing moisture comprising introducing upon the wood a liquid, the temperature of which is lower than the temperature of the wood, the differences in temperature creating a vacuum by condensing the moisture in the wood and thereby causing the interior moisture to move toward the surface of the wood.

52. The process of treating heated wood comprising creating a vacuum by a cooling medium, the temperature of which is below the temperature of the wood, the differences between the internal and external temperatures causing the interior moisture in the wood to move surface-wise.

53. The process of treating wood, comprising heating the wood to soften it, and subjecting it to alternate pressure and vacuum sufficient to cause the interior moisture to move surface-wise, then subjecting it to superheated water.

54. The process of treating wood comprising subjecting the wood to heated water to dissolve and remove water soluble constituents, removing the water, then suddenly reducing the temperature and pressure around and in the wood by the introduction of cool water to cause expansion of the wood, and the moisture therein to move surface-wise and thereafter drying the wood.

55. The process of treating wood comprising submerging the wood to super-heated water and while submerged alternately raising and lowering the pressure, removing the water, then suddenly reducing the temperature and pressure by spraying the wood with cool water to cause expansion of the wood, and the moisture therein to move surface-wise and thereafter drying the wood.

56. The process of treating wood, comprising subjecting the wood to water under pressure below atmospheric, and at a temperature sufficient to boil it, removing the water to dissolve and remove the water soluble constituents, removing the water, and then drying the wood.

57. The process of treating wood, comprising heating the wood to soften it, and subjecting it to alternate pressure and vacuum sufficient to cause the interior moisture to move surface-wise, then subjecting it to superheated water, removing the water, and thereafter reducing the pressure.

58. The process of treating wood to sweat and soften same, thereafter removing the wood and subjecting same to heated water and in such removal exposing the wood to atmospheric conditions and thereafter drying the wood.

In testimony whereof I affix my signature.

FREDERICK K. FISH, Jr.